US008123255B2

(12) United States Patent
Kovacevitch

(10) Patent No.: US 8,123,255 B2
(45) Date of Patent: Feb. 28, 2012

(54) SECURITY DEVICE FOR CONFIDENTIAL INFORMATION

(75) Inventor: Michel Kovacevitch, Carthage (TN)

(73) Assignee: Page International—FZ—LLC, Dubai (AE)

( * ) Notice: Subject to any disclaimer, the term of this patent is extended or adjusted under 35 U.S.C. 154(b) by 443 days.

(21) Appl. No.: 12/308,104

(22) PCT Filed: Jun. 7, 2007

(86) PCT No.: PCT/FR2007/000943

§ 371 (c)(1), (2), (4) Date: May 15, 2009

(87) PCT Pub. No.: WO2007/144486

PCT Pub. Date: Dec. 21, 2007

(65) Prior Publication Data

US 2010/0013209 A1 Jan. 21, 2010

(30) Foreign Application Priority Data

Jun. 16, 2006 (FR) ..................................... 06 05377

(51) Int. Cl.

| | |
|---|---|
| ***B42D 15/00*** | (2006.01) |
| ***B32B 9/00*** | (2006.01) |
| ***B32B 33/00*** | (2006.01) |
| ***B65D 65/28*** | (2006.01) |
| ***G09F 3/00*** | (2006.01) |

(52) U.S. Cl. ........ 283/103; 283/100; 283/105; 283/901; 428/42.3; 428/43

(58) Field of Classification Search .................... 283/81, 283/94, 98, 100, 101, 103, 105, 901, 903; 428/42.3, 43

See application file for complete search history.

(56) References Cited

U.S. PATENT DOCUMENTS

| | | | | |
|---|---|---|---|---|
| 6,231,082 | B1 * | 5/2001 | Van Boom et al. | 283/100 |
| 6,481,753 | B2 * | 11/2002 | Van Boom et al. | 283/901 |
| 6,523,859 | B2 * | 2/2003 | Scheggetman et al. | 283/100 |
| 6,686,014 | B1 * | 2/2004 | Washburn et al. | 428/42.3 |
| 2004/0209028 | A1 * | 10/2004 | Gosselin | 428/40.1 |

FOREIGN PATENT DOCUMENTS

| | | | |
|---|---|---|---|
| DE | 197 55 793 | A1 | 7/1999 |
| EP | 1 293 359 | A2 | 3/2003 |
| EP | 2003634 | A2 | 12/2008 |
| FR | 2 827 217 | A1 | 1/2003 |
| FR | 2 840 251 | A | 12/2003 |
| WO | WO 99/24267 | | 5/1999 |
| WO | WO 99/42295 | A | 8/1999 |
| WO | WO9964252 | * | 12/1999 |

OTHER PUBLICATIONS

WO9964252 Translation.*

* cited by examiner

*Primary Examiner* — Dana Ross
*Assistant Examiner* — Kyle Grabowski
(74) *Attorney, Agent, or Firm* — Dowell & Dowell, P.C.

(57) ABSTRACT

This security device for confidential information, mentioned in a document (D), includes an element (1, 4) forming a data storage medium and removable element (6), masking the information (C). It includes, in addition, at least one zone of structural weakness (30, 31) provided for in the document (D) near the data storage medium element (1, 4) with this zone (30, 31) forming one piece with the removable masking element (6).

11 Claims, 5 Drawing Sheets

SECURITY DEVICE FOR CONFIDENTIAL INFORMATION

BACKGROUND OF THE INVENTION

1. Field of the Invention

The invention concerns a security device for confidential information mentioned in a document. It also relates to a method for implementing such a device.

2. Description of the Related Art

A document can make it possible to communicate, in a confidential manner and to a given recipient, information such as for example an alphanumeric code. This type of document is encountered, for example, in the fields of banking, telecommunications, health, games and security. The application of the device of the invention is also envisaged in other fields where information circulates that is to be read by only a restricted number of people.

In order to ensure the confidentiality of the information while the document is circulating between the sender and the recipient, a device where confidential information is covered with a masking printing is known for example from FR-A-2 840 251, the information becoming readable by scratching off the masking printing. Depending on the masking printing, it may be possible, under certain lighting, to read the information without scratching off the masking printing. Additionally, excessive scratching may damage the printed information. There is then a risk of erroneous or impossible reading of at least part of the information. A masking element whose part covering the information is precut and does not adhere to the latter is also known through WO-A-99/24267. It suffices to remove this part in order to gain access to the information. By partially lifting the masking element at the level of the precut, it is possible to read the information. Additionally, it is possible to reposition this masking element after reading.

EP-A-1 293 359 describes a film on which information is printed. This film is stuck onto a document, at the level of a masking printing. The removal of the film, with the aid of a tab, causes defibration of the constituent material of the document, in this instance paper. With such a device, it is possible to unstick the film, read the information, reposition and restick the film without the defibration of the paper being visible.

SUMMARY OF THE INVENTION

It is these drawbacks that the invention more particularly intends to remedy by proposing a security device for confidential information where the information cannot be remasked after having been read a first time, without risk of erroneous reading.

For this purpose, the subject of the invention is a security device for confidential information mentioned in a document, this device comprising an element forming a support for this information and a removable element for masking the information, characterized in that the device comprises at least one zone of structural weakness made in the document, in the vicinity of the information support forming element, this zone being fastened to the removable masking element.

The presence in the document of a zone of structural weakness, attached to the masking element, gives rise to irreversible, irreparable and unconcealable spoiling of the document when the masking element has been removed for a first reading of the information.

According to advantageous but non-obligatory aspects of the invention, the device can incorporate one or more of the following characteristics:

- The zone of structural weakness comprises at least one precut zone in the document. This zone of weakness comprises two precut strips distributed in the vicinity of two parallel edges of the information support forming element, on either side of the latter.
- The information support forming element comprises at least one first tag on which the information is printed, the tag being affixed to a first face of the document, covering a window made in the document and protruding from the document.
- The information support forming element comprises a second, transparent, tag covering the window and attached to the first tag, on a second face of the document opposite the first face.
- The masking element is produced by a third tag on which is printed a masking pattern covering at least the informational part.
- A protective element formed by a fourth tag is fixed in an enduring manner on a face of the removable masking element and on the zones of structural weakness, so as to attach the removable masking element to the zones of structural weakness.
- The masking element has dimensions at least equal to the sum of the dimensions of the window and of the zones of structural weakness at the level of which it is fixed in an enduring manner.
- The removable masking element is fixed to the tag covering the information by an adhesive such that the tag is not repositionable after having been unstuck.

The invention also relates to a method for implementing a security device for confidential information mentioned in a document, characterized in that it comprises steps consisting in:

a) making, in a document, a window and at least one zone of structural weakness of the document in the vicinity of an edge of the window;

b) fixing, on a first face of the document and in the vicinity of this window, a first part of an information support forming element;

c) fixing, on a second face of the document opposite from the first and in the vicinity of the window, a second part of the information support forming element;

d) positioning a removable masking element on the second part of the information support forming element.

According to advantageous but non-obligatory aspects of the invention:

- after step d), during a step e), a protective element is fixed in an enduring manner on the zone (or zones) of structural weakness and on the masking element;
- after one of steps b), d) or e), the information is printed on a face of the first part of the element forming a support for this information.

BRIEF DESCRIPTION OF THE DRAWINGS

The invention will be better understood and other advantages thereof will be more clearly apparent on reading the description which follows of two devices in accordance with the invention and of a method of implementation, given solely by way of example and while referring to the appended drawings in which.

DESCRIPTION OF THE PREFERRED EMBODIMENTS

The information security device represented in FIGS. 1 to 5 is applied to a document D, in this instance a sheet of lightweight paper or cardboard. The term document is understood to mean a material in sheet form, based in particular on cellulose or polymers, of standardized or non-standardized dimensions. Such a document D comprises confidential information and, optionally, other non-confidential information. The term confidential information is understood to mean information the reading of which is reserved for one or more predefined person(s). This information is, for example, an alphanumeric code C making it possible to activate a telephone apparatus, a bank card, to gain access to a specific place or to a database, an Internet or intranet site, to use a given apparatus or any other access and/or usage subject to restriction.

Figure 1:
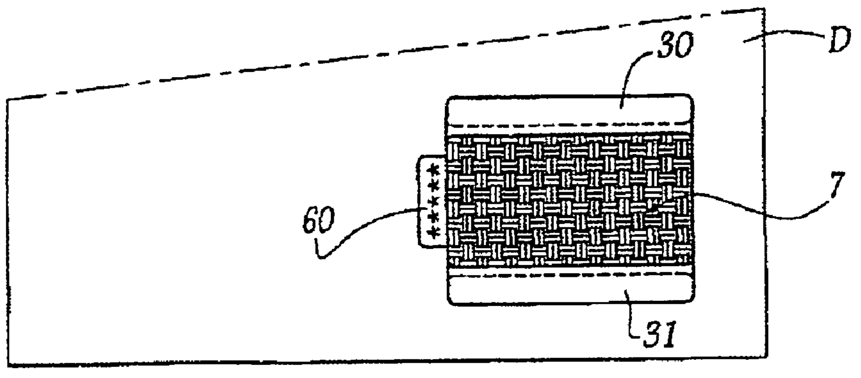
FIG. 1 is a partial view of the verso of a document equipped with an information security device, in accordance with the invention, before a first reading.
Figure 2:
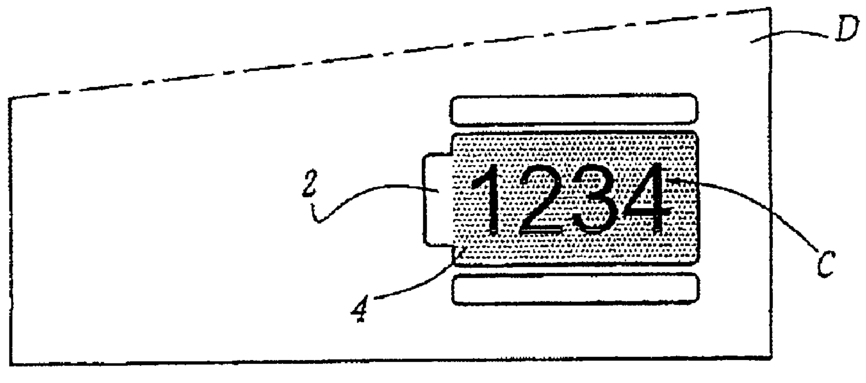
FIG. 2 is a view similar to FIG. 1 after a first reading of the information.
Figure 3:
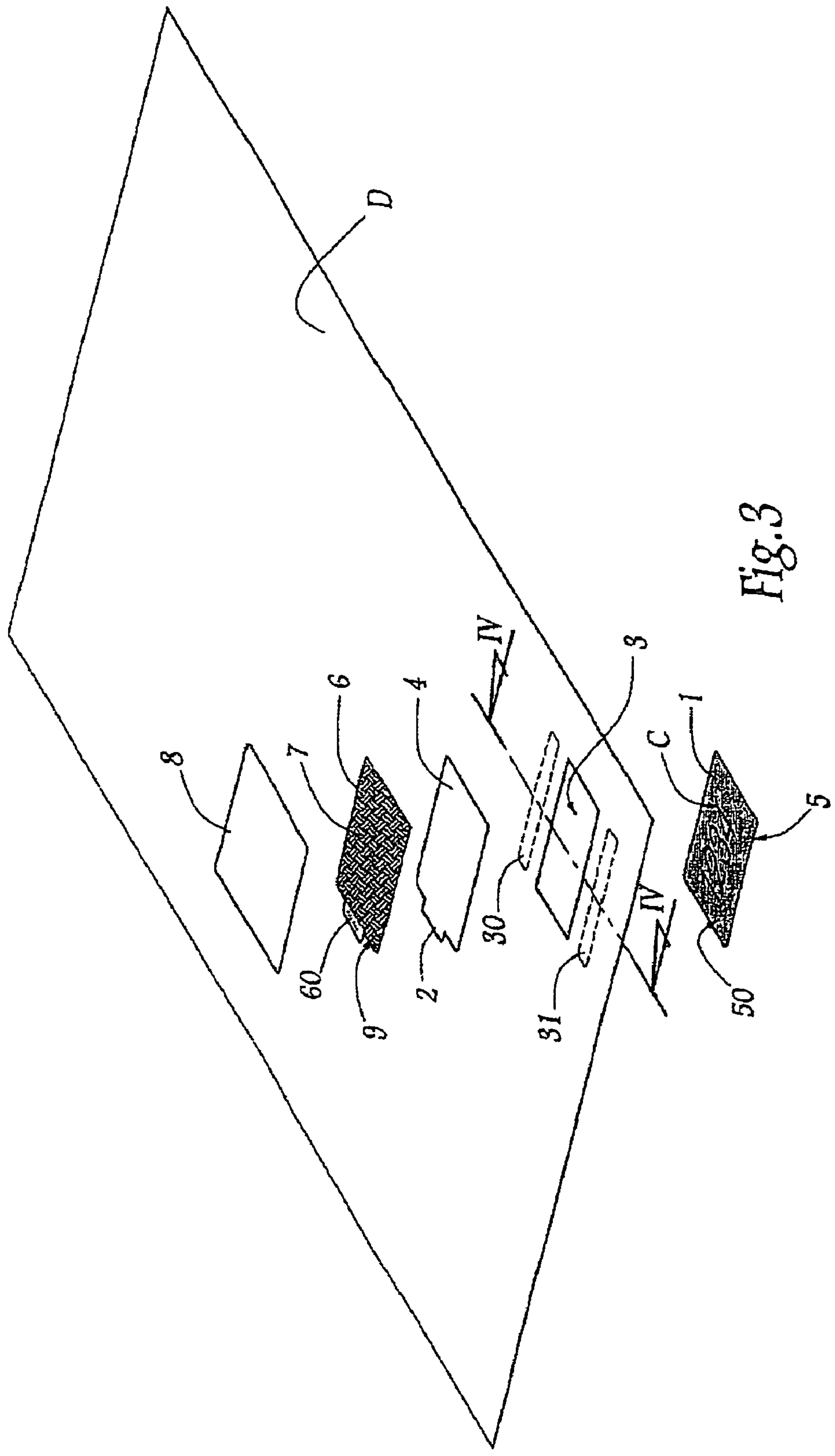
FIG. 3 is an exploded representation of the constituent elements of the security device according to a first embodiment, before their implementation on a document.
Figure 4:
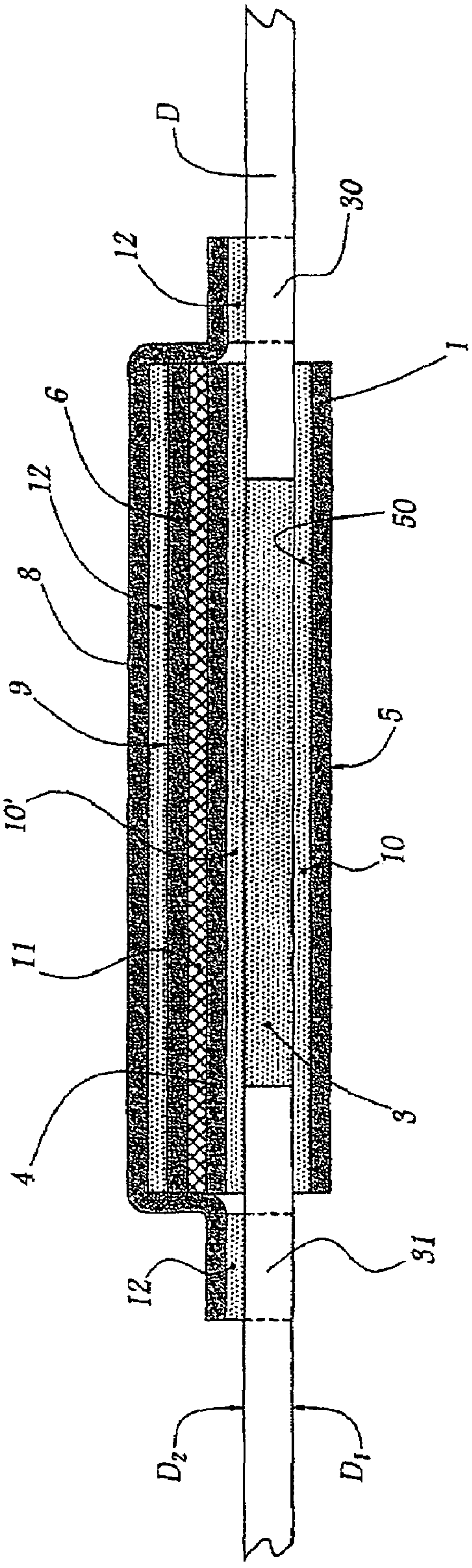
FIG. 4 is a schematic sectional cut, on a larger scale and along the line IV-IV in FIG. 3, through the security device in place on a document before a first reading.

The device comprises several elements represented exploded in FIG. 3. A first tag 1 forms a first part of the element forming a support for the information. This first tag 1 consists of a sheet made of a transparent material, advantageously a matt material. It may for example be a polyester tag. As a variant, this element 1 can be non-transparent or tinted. In the example, this first tag 1 has a rectangular shape and dimensions of about 25 mm wide by 50 mm long. As a variant, other dimensions and/or shapes are possible.

This first tag 1 can be positioned on a first face $D_1$ of the document D, at the level of a window 3 previously cut in the document D.

At least one edge of this window 3 is situated in the vicinity of a zone of structural weakness 30, 31 of the document D. In the example, two parallel edges of the window 3 are situated, each, in the vicinity of a zone of structural weakness. These zones are obtained by precutting two strips 30, 31 in the document D. The window 3 has dimensions substantially less than those of the tag 1, such that at least one and, advantageously, all the edges of the tag 1 each overlap an edge of the window 3 while protruding from the document D. The width of overlap of the document D by the tag 1 is sufficient to avoid any tearing of the window 3 and/or detachment of the tag 1.

This first tag 1 can cooperate with a second part of the element forming a support for the information consisting of a second tag 4. This second tag 4 is of a similar nature and similar shape to the first. As a variant, it is of a different nature and/or different shape. In all cases, it is transparent and must be adapted so as also to cover the window 3 while protruding from the document D. Advantageously, the tag 4 is made of a transparent and glossy material, for example polypropylene.

The confidential information C is printed, mirror inverted, on a face 5 of the first tag 1. The information C is therefore printed the wrong way round on the face 5, so as to be read, the right way round, from the face 50 of the tag 1, opposite from the face 5. The information C is transferred to the tag 1 by marking techniques that are known per se, for example by offset printing, laser printing, ink jet printing or the like. The first and second tags 1, 4 constituting the element forming a support for the information can be disposed on either side of the document D. Specifically, the first tag 1 is situated on the face $D_1$, for example the recto, of the document D and the second tag 4 is situated, opposite on the other face $D_2$, in this instance the verso of the document. The information C is therefore readable, the right way round, when looking at the verso of the document and readable, the wrong way round, when looking at the recto of the document.

The non-printed face 50 of the tag 1 fixed to the recto $D_1$ of the document D is covered, in an enduring manner, by the second tag 4. For this purpose, the second tag 4 is positioned on the window 3, on the verso $D_2$ of the document, and attached to the first tag 1 with the aid of an adhesive.

The second tag 4 is equipped with at least one gripping zone 2 formed by a tab 2 made on one of its edges. As a variant, the tag 4 can be devoid of any tab 2.

The tag 4 is thereafter covered with a masking element 6 able to conceal the information C on the side of the verso $D_2$ of the document D. The masking element is formed by a tag 6. The shape and dimensions of this third tag 6 are globally similar to those of the tags 1 and 4, so as to totally cover them. As a variant, it is able to cover only the part where the information C is inscribed, the "empty" part of the tags 1, 4 not being masked. This masking element 6 comprises a scrambling printing 7, or "blanking", advantageously formed by an interleaving of digits and/or of letters. This interleaving forms a camouflage preventing the information C situated below from being read, directly or by transparency, whether reading is attempted from the recto or the verso of the document D. The joint use of transparent tags 1 and 4, with a scrambling printing 7 on the tag 6, makes it possible to avoid any reading of the information C by transparency with direct or indirect lighting. The constituent characters of the information are concealed by the blanking 7, with the same luminous contrast as the latter and cannot therefore be distinguished from the patterns forming the blanking 7 by varying the lighting. For this purpose, it is advisable that the tags 1 and 4, the information C and the blanking 7 be made in globally identical hues. Conversely, the use of hues differing between the various elements 1, 4 and 7 and the information C would have induced a difference in contrast between the information C and the elements 1, 4 and 7, which would have allowed the information to be read by transparency.

Advantageously, only the part 60 of the third tag 6 which covers the gripping member 2 and which de facto forms a gripping element is not equipped with a masking. This part 60 is advantageously provided with an indication specifying, for example, the use of the masking element 6. This indication can be a color marking, a pictogram or inscription entirely in letters. As a variant, the tag 6 can be provided with several parts 60 forming several gripping elements.

A sheet-like protective element 8 is positioned above the masking element 6. This sheet-like protective element is formed by a fourth tag 8, in the example transparent, whose dimensions both width-wise and length-wise are greater than the dimensions of the masking, tag 6 and at least equal to the sum of the dimensions of the window 3 and of the precut strips 30, 31. This fourth tag 8 will thus completely cover the upper face 9 of the masking tag 6. The fourth tag 8 protrudes on either side of the tag 6, so as to cover not only the area of the window 3 but also the areas of the zones of structural weakness 30, 31. This protective element 8 is fixed in an enduring manner to the third tag 6 and to the precut strips 30, 31. The protective element 8 thus makes it possible to attach the masking element 6 to the document D.

Figure 5:
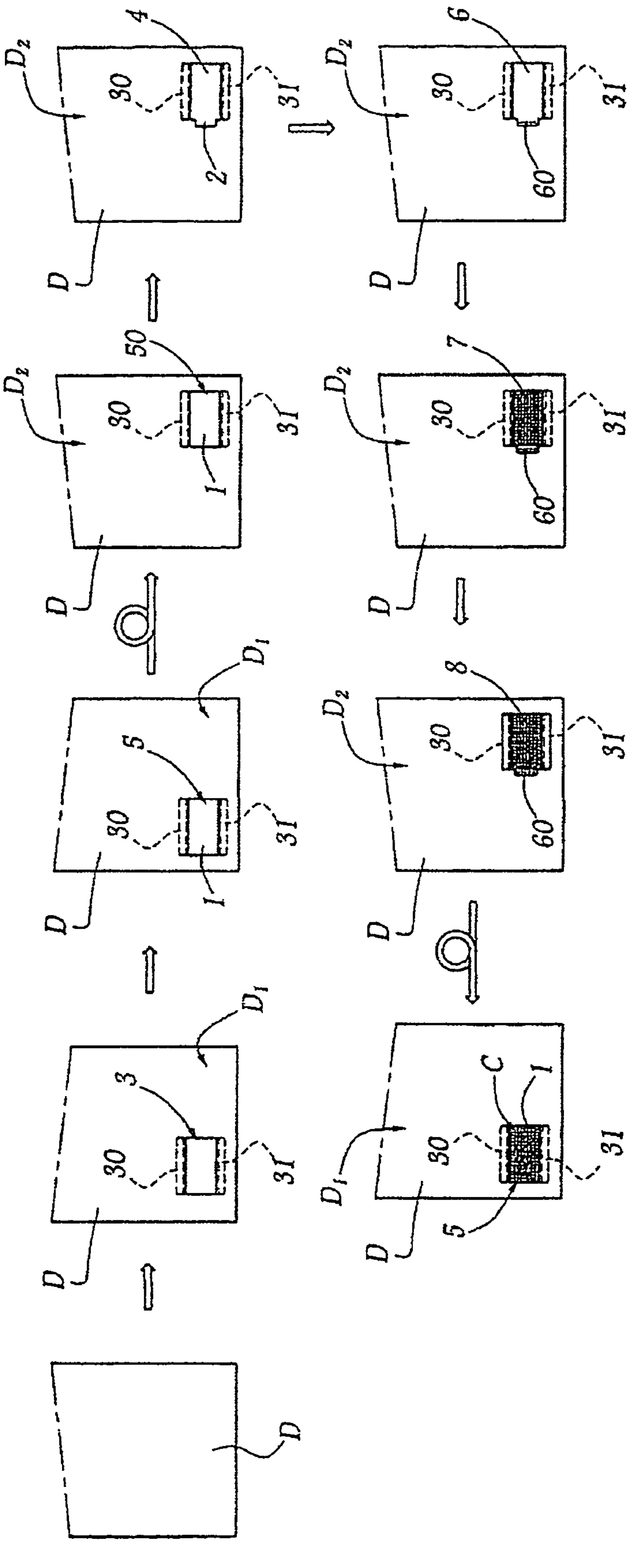
FIG. 5 is a schematic representation of the method for implementing the security device on a document according to the first embodiment.

To produce a document equipped with such a device, the procedure illustrated in FIG. 5 is carried out. On the basis of a document D, printed or otherwise, a cut is made, corresponding substantially to the dimensions of the window 3. This operation is advantageously performed continuously, the document D initially taking the form of a paper strip. During this cutting, two zones of structural weakness 30, 31 are also produced by puncturing the document in the vicinity of the two longitudinal edges of the window 3.

Two parallel, precut strips 30, 31 are thus formed in the vicinity of these longitudinal edges. In a variant (not illustrated), the width of the strips 30, 31 and/or their position and/or their number are different. The zones 30, 31 can also take forms other than precut strips, for example the form of precut circles disposed alongside one another. These zones 30, 31 can, in another embodiment, be limited to precut lines. The zones 30, 31 can, as a variant, be produced by lines or strips of lesser thickness made in the constituent material of the document D.

Then, in a second step, the first tag 1 is positioned on this window 3. The dimensions of this tag 1 are sufficient for it to totally cover the window 3 and protrude, on all the sides, from the face $D_1$ of the document D. The precut strips 30, 31 are not covered by the tag 1. The tag 1 is fixed in an enduring manner to the document D with an adhesive 10, schematically represented in FIG. 4. The adhesive is strong, permanent, U.V. resistant and transparent. A face 5 of the tag 1 is intended to be printed with the confidential information C. This face 5 is positioned so as to be oriented towards the face $D_1$ of the document D. Stated otherwise, a face 50 for sticking the tag 1 is oriented towards the verso $D_2$ of the document, a face 5 of the tag 1, which must be printed, being oriented towards the recto $D_1$ of the document.

The next step is performed after turning the document over so as to bring the verso $D_2$ of the document D into a visible position.

The second tag 4 is thereafter stuck in a definitive manner with a strong adhesive 10', for example of the same type as the adhesive 10, on the face 5 of the first tag 1 from the verso of the document D. This tag 4 also covers the window 3 while protruding from the document D but without covering the precut strips 30, 31. The adhesives 10 and 10' come together in the window 3 and attach the tags 1 and 4 to one another through this window. In all cases, the adhesive 10' used to attach the tag 4 to the document D and to the tag 1 must allow easy and undisrupted reading of the information C. The sticking is suitable for it not to be possible to separate the two tags 1, 4 fixed on either side of the window 3. Thus, the tag 1 is fixed in an enduring manner to the document D at the level of the window 3. As a variant, the tag 1 can comprise several precut regions, so that it fragments into small pieces that cannot be repositioned during attempted removal.

The next step enables the information masking tag 6 to be put into place. Advantageously, this tag has the same shape and the same dimensions as those of the tag 4. In all events, it must at least mask the information C. The tag 6 is advantageously formed of a transparent sheet material. The masking 7 proper, or blanking, is advantageously printed before the tag 6 is put into place on the tag 4. As a variant, illustrated in FIG. 5, the blanking 7 is printed after the tag 6 is put into place.

The masking tag 6 is positioned in a removable manner. For this purpose, use is made of a so-called transient glue 11, represented in FIG. 4, that is disposed between the tags 4 and 6. This glue 11 exhibits the feature of curing under the action of ultraviolet rays. This glue 11 is a low-adhesion glue so as to allow easy removal of the tag 6.

When the glue 11 is cured, the previously joined tags 4, 6 are attached while remaining easily separable. After separation, the glued faces of the tags 4 and 6 dry rapidly and then become non-adhesive. Stated otherwise, this glue 11 enables two objects to be stuck together and unstuck once, with no possibility of resticking the objects.

Such a glue 11 allows the tag 6 to be removed easily, by pulling on the part 60, so as to access the information C by direct reading through the tag 4 and the window 3. It is no longer possible for the tag 6 to be put back into place on the tag 4 after a first reading, as the adhesive 11 is no longer effective.

In a next step, a sheet-like protective element consisting of a tag 8 is positioned on the upper face 9 of this masking tag 6. This fourth tag 8 has dimensions such that it covers totally, at least, the tag 6 and the precut strips 30, 31. This tag 8 is stuck onto the tag and onto the strips 30, 31 in an enduring manner with a strong adhesive 12, for example of the same type as the adhesives 10 and 10', so as to induce peeling of the precut strips 30, 31 simultaneously with the removal of the tag 6. Stated otherwise, the tag 6 is fastened to the strips 30 and 31 through the tag 8 which, when the tag is removed, peels the strips 30 and 31 from the document D. The tag 8 is made of a tear resistant material, for example polypropylene. It can, as a variant, be non-transparent and/or furnished with an informational or advertising marking.

Before a step, known per se, of cutting and packaging the documents D thus equipped with the security device, it is possible, if necessary, to perform a pressing of the documents. This pressing makes it possible to improve the cohesion between the various tags 1, 4, 6 and 8 by expelling the air bubbles and by pressing the adhesives 10, 10', 11 and 12 between the tags. During this pressing, the adhesives 10, 10', of the same type in the example, mix together and occupy the whole of the available volume between the tags 1 and 4.

The documents thus produced are furnished with the information security device ready to receive the information C. The latter is printed with a backdrop and/or digits on the face 5 of the tag 1 by the sender of the document. This printing can be done during customized printing of the document or on a document on which other information already appears. In this way, the sender of the document prints confidential information C which is immediately concealed and made secure without requiring a subsequent processing of the document D bearing this information C. This printing of the information C can also be done, not on an individualized document D, but continuously as illustrated in FIG. 5, subsequent to the step of putting the tag 8 into place. For this purpose, the document D is turned over a second time for printing. In this case, the operation of cutting and packaging the documents is done after this information printing step. In all events, the information C is concealed by the blanking 7 as soon as this information C is printed on the face 5 of the tag. As a variant, the information C is printed on the face 5 after the second step that is to say after the tag 1 is put into place on the window 3. The information C then remains readable until the masking tag 6 is put into place.

In all events, the printing is performed the wrong way round so as to be readable the right way round from the verso of the document.

Figure 6:
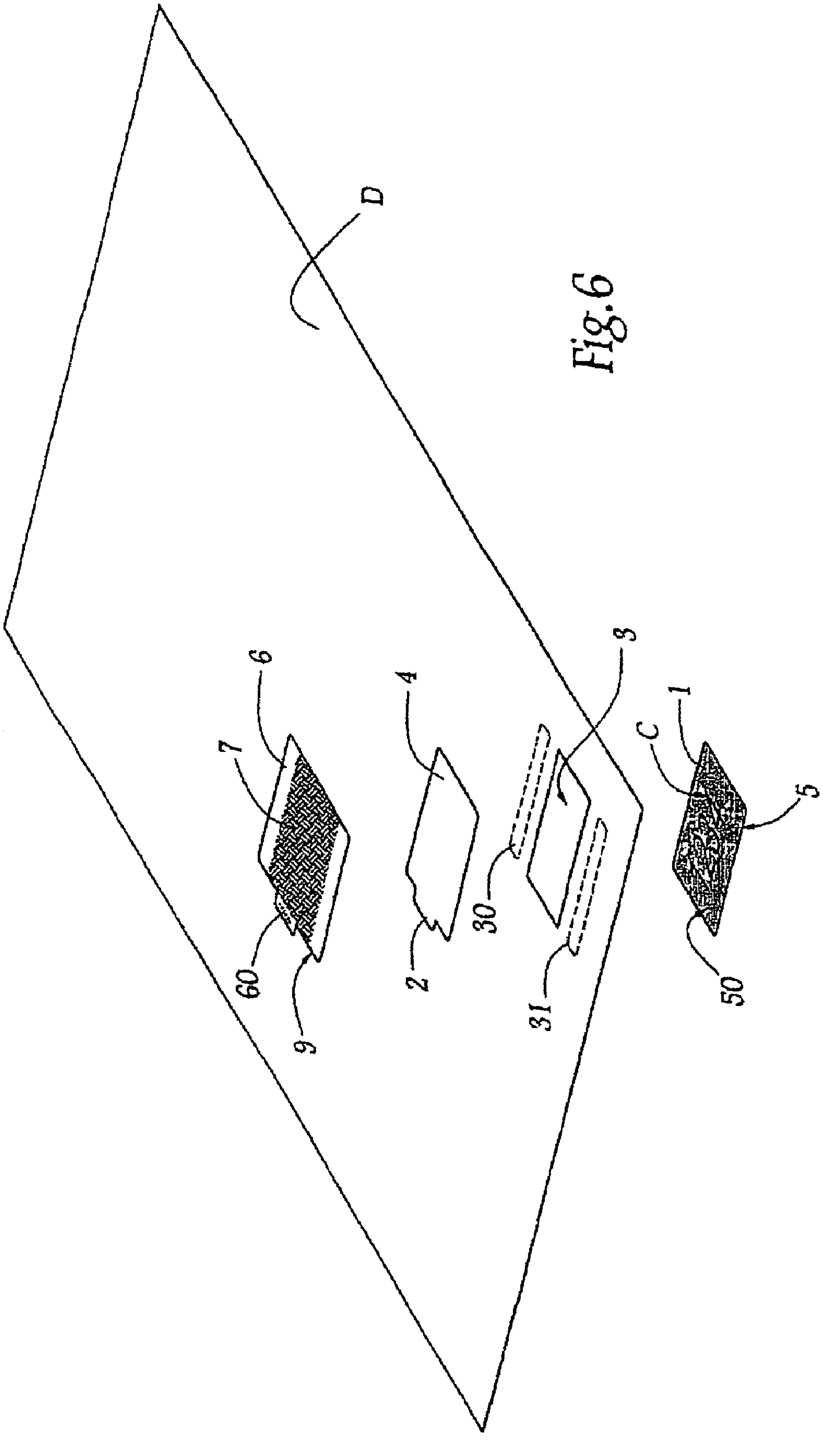
FIG. 6 is a view analogous to FIG. 3 for a device in accordance with a second embodiment of the invention.

In the second embodiment illustrated in FIG. 6, the elements analogous to those of the first embodiment bear the same references. Only that which differentiates this embodiment from the previous one is described hereinafter. The masking element 6 has greater dimensions than those of the window 3. In this instance, these dimensions are at least equal to the sum of the dimensions of the window 3 and of the precut strips 30 and 31. Stated otherwise, in this embodiment, the dimensions of the masking element 6 are substantially those described previously for the protective element formed by the tag 8.

The face of this masking element overlooking the window 3 is coated with a strong glue at the level of the zones covering the strips 30 and 31. Thus, the masking element is equipped, on the same face, with a transient glue 11 at the level of the zone covering the information C and a strong glue 10 or 10' at the level of the precut strips 30 and 31. The masking element is therefore fixed to the precut strips in an enduring manner. The external face of the zones of the masking element covering the strips 30 and 31 can be provided with a printing, masking or the like. In this way, upon its removal this masking element allows, in addition to the revealing of the information C, the peeling of the precut strips 30 and 31. Stated otherwise, the protective element 8 of the previous embodiment is no longer necessary, the masking element 6 being sufficiently strong and having suitable dimensions as well as an appropriate distribution of adhesives of different kind so as not to require the use of this element.

With such a solution the last step of the method for implementing the device and consisting in fixing the protective element 8 on the masking element 6 is optional.

In the two embodiments described above, by virtue of the link between the tag 6 and the strips 30 and 31, even if it were desired, by putting glue 10, 10', 11 or 12 back onto the lower face of the tag 6, to reposition the latter on the tag 4, the removal of material in the document D at the level of the strips 30 and 31 around the window 3 makes it immediately evident that the information C has already been read. Specifically, the window 3 is then bordered by two orifices whose shape corresponds globally to that of the strips 30, 31 which have been peeled. These latter cannot be put back into place on the document D without this repositioning being evident.

The invention claimed is:

1. A document with a security device for confidential information mentioned in the document, the document comprising a window cut in the document, two precut strips in the document at a vicinity of two parallel edges of the window, a first transparent tag on which the confidential information is printed, the first tag being affixed to a first face of the document so as to cover the window and protrude from the document, a second transparent tag covering the window and attached to the first tag on a second face of the document which is opposite the first face, a removable tag for masking the information which is printed on the first tag, the removable tag being fixed to the second tag by an adhesive such that the removable tag is not repositionable in an adhesive manner onto the second tag after being removed therefrom, and the removable tag being of a size to cover an area of the window and the two precut sties.

2. The document of claim 1 wherein the removable tag includes a scrambling printing which covers at least the confidential information printed on the first tag.

3. The document as claimed in claim 1, wherein the removable tag includes a blanking which covers at least the confidential information printed on the first tag.

4. The document as claimed in claim 1, wherein a protective element formed by a fourth tag is fixed in an enduring manner on a face of the removable tag and on the precut strips so as to attach the removable tag to the precut strips.

5. A method for forming a document having a security device for confidential information mentioned in the document, comprising the steps of:

a) making, in the document, a window and at least one precut strip in a vicinity of an edge of the window;

b) fixing, on a first face of the document and in the vicinity of the window, a first tag of an information support;

c) fixing on a second face of the document opposite from the first face and in the vicinity of the window, a second tag of the information support; and d) positioning a removable masking tag on the second tag of the information support.

6. The method as claimed in claim 5, wherein, after step d), during a step e), a protective element is fixed in an enduring manner on the at least one precut strip and on the removable masking tag.

7. The method as claimed in claim 6, wherein, after step d), the information is printed on a face of the first tag of the information support.

8. The method as claimed in claim 6, wherein, after step e), the information is printed on a face of the first tag of the information support.

9. The method as claimed in claim 6, wherein, after step b), the information is printed on a face of the first tag of the information support.

10. The method as claimed in claim 5, wherein, after step b), the information is printed on a face of the first tag of the information support.

11. The method as claimed in claim 5, wherein, after step d), the information is printed on a face of the first tag of the information support.

* * * * *